United States Patent Office 3,702,658
Patented Nov. 14, 1972

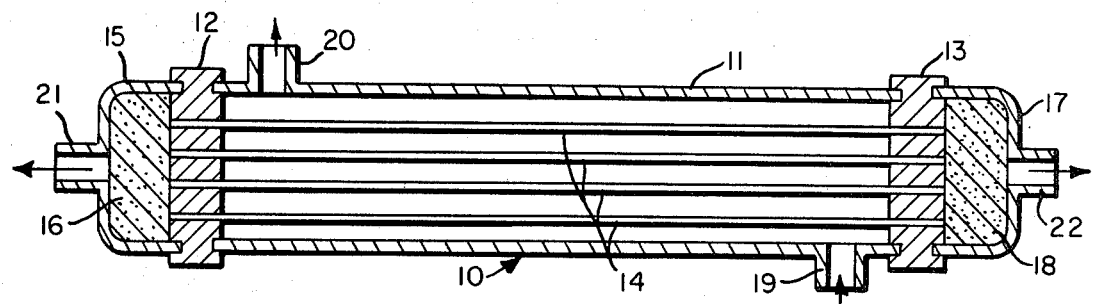
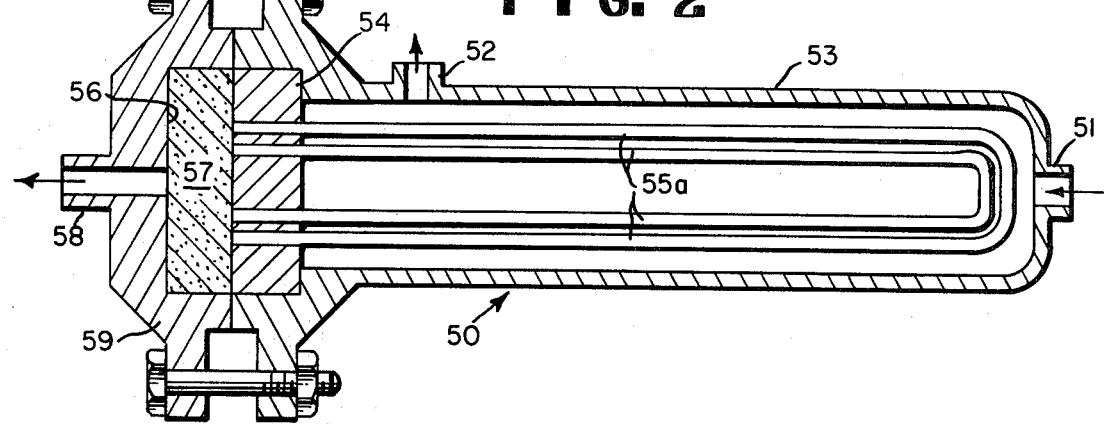
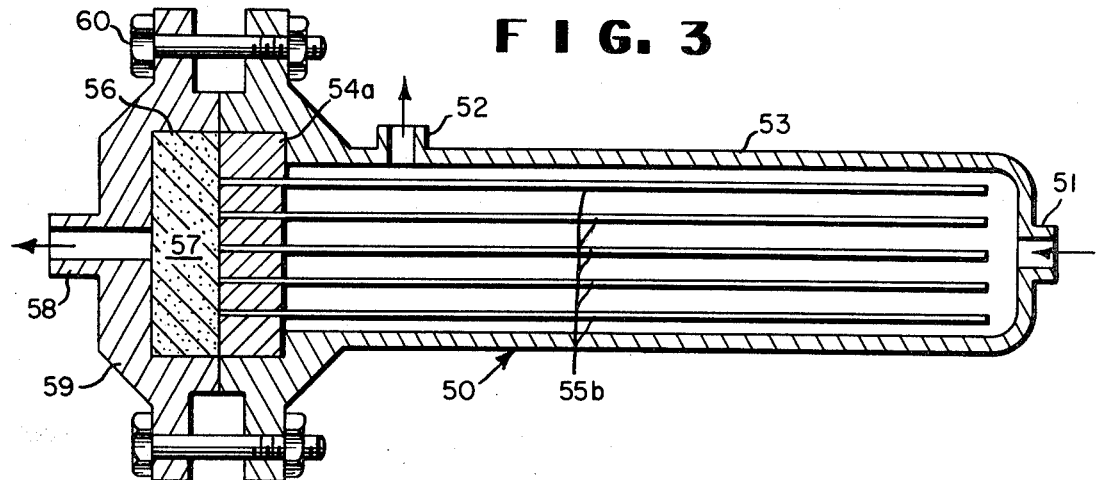
INVENTORS
JAMES FRANCIS McNAMARA
RICHARD ELLIS TURNER
BY Theodore C. Gregory
ATTORNEY

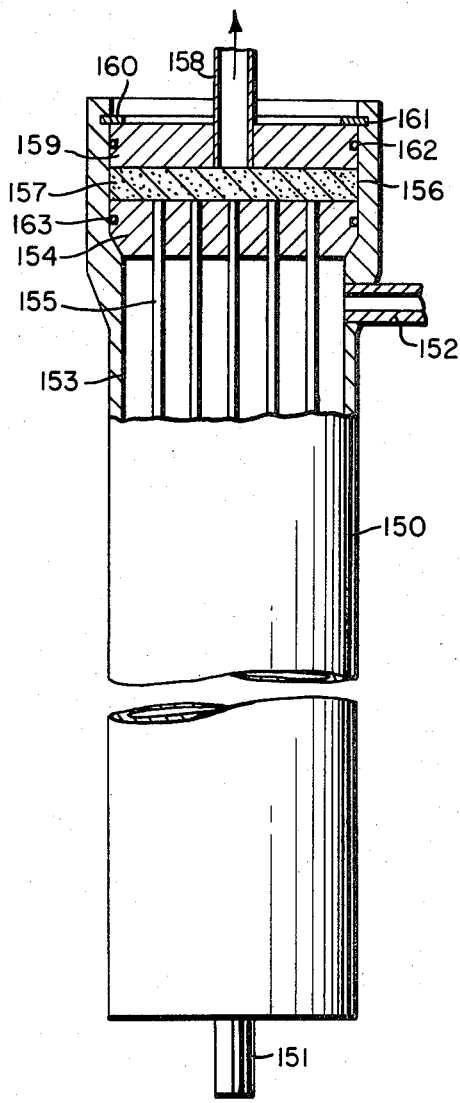

3,702,658
PERMEATION SEPARATION APPARATUS
James Francis McNamara, Wilmington, and Richard Ellis Turner, Newark, Del., assignors to E. I. du Pont de Nemours and Company, Wilmington, Del.
Continuation-in-part of application Ser. No. 883,791, Dec. 10, 1969. This application Feb. 24, 1971, Ser. No. 118,341
Int. Cl. B01d 31/00
U.S. Cl. 210—321                                19 Claims

ABSTRACT OF THE DISCLOSURE

Permeation separation apparatus incorporating selectively permeable capallaries positioned by polymeric cast wall member(s) or capillary-sheet(s), said capillaries being open at the wall member(s) or capillary sheet(s), for use in separatory procedures wherein a pressure differential is applied across the capillary sheets, such as in reverse osmosis. Dimensional and relative positional changes as are involved in creep and plastic deformation of the capillary sheets and as are occasioned after extended periods of use are avoided by the improved feature of an inert porous, non-compressible material, such as epoxy resin bonded sand, being provided adjacent to the lower pressure face of a capillary sheet in a manner to transmit the pressure differential to the apparatus.

CROSS-REFERENCE TO RELATED APPLICATIONS

This application is a continuation-in-part of my copending application Ser. No. 883,791, filed Dec. 10, 1969, titled Improved Permeation Separation Apparatus now abandoned.

BACKGROUND OF THE INVENTION

(1) Field of the invention

This invention relates to improved permeation separation apparatus and, particularly, to such apparatus incorporating selectively permeable, hollow fiber or capillary membranes. More particularly, the invention relates to improved hollow fiber permeation devices for use in the reverse osmosis separation of fluid components and incorporating supported polymeric resin capillary sheets.

(2) Description of the prior art

Permeation separation devices are well known in the prior art and comprise apparatus incorporating selectively permeable or semipermeable membranes. Such membranes permit passage of different components of fluid mixtures at different rates and, accordingly, may be judiciously selected to effect desired separations of such components. While the desirable characteristics of selectively permeable membranes are attributable essentially to the material of which the membranes are composed, the physical configuration of such membranes is recognized as largely determinative of the efficiency and economic feasibility of the commercial fluid separation devices wherein the membranes are employed. Mahon in U.S. Pat. 3,228,876 discusses illustrative membrane materials comprising cellulose acetate and the effect of the physical configuration. In this regard, the most common membrane physical configurations developed heretofore have consisted of hollow fibers or thin films.

For many purposes, including desalination of brackish water and sea water, recovery of salts from saline solutions, concentration of industrial solutions, and gaseous separations including the separation of hydrogen from off-gases of dehydrogenation processes, hollow fiber membranes exhibit significant advantages over flat film membranes. The physical configuration of flat film membranes is such that practical transfer rates may be achieved only by the use of a uniplanar plate of exceedingly large area or by the use of large pluralities of such plates. Additionally, prior art designs of separation devices incorporating flat film or uniplanar membranes have required such membranes to be rigidly supported by solid backing members which take up space in considerable proportion and constitute "dead" weight. The resultant tendency of uniplanar membranes in such structures is to exhibit a relative weakness which often manifests itself by rupture when in use.

Hollow fiber membranes, generally comprising a multiplicity of fine, continuously hollow fibers, have also been employed in prior art fluid separation devices and, in contrast to thin film or uniplanar membranes, provide exceedingly large transfer areas for given volumes of space occupied by such devices. Thus, fluid separation devices incorporating hollow fiber membranes provide a high ratio of transfer area to apparatus volume. Furthermore, the hollow fiber configuration achieves a much greater membrane strength than is possible with the uniplanar configuration for a given wall thickness, thereby permitting the use of relatively thin-walled membranes. Accordingly, disadvantages attendant the use of relatively thicker membranes, e.g., higher resistance to permeation, as well as disadvantages occasioned by weaker membranes, e.g., necessity for backing plates and equivalent membrane supports, are avoided or minimized.

The fluid separation devices commonly employing hollow fiber membranes resemble a shell-and-tube heat exchanger and generally comprise a closed structure or shell of cylindrical shape which is substantially completely filled with one or more bundles of the hollow fibers or capillaries. Depending upon the particular design, one or two header plates or capillary sheets may be employed to position the ends of the capillaries and effect a fluid seal between the shell-side and capillary-side of a device. In a double-ended design, illustrated by Maxwell et al. in U.S. Pat. 3,339,341, the hollow fibers or capillaries are arranged along the length of the shell and are supported at their terminal portions by a pair of generally parallel, spaced apart capillary sheets. The capillaries open into and communicate with spaces enclosed by outer closures at each end of the shell and comprising capillary-side or header chambers. The space inside the shell and outside the capillaries and bounded by the capillary sheets comprises the shell-side chamber. Openings for the introduction or discharge of fluids are provided in the device, generally one each in the capillary side chambers and two in the shell-side chamber.

Another separatory device design utilizing selectively permeable, hollow fibers is disclosed in British Pat. 1,019,881. In this design the hollow fibers do not extend the length of the shell and emerge from both ends, as in the Maxwell et al. design but, rather, the fibers extend the length of the shell and are then doubled or looped back the length of the shell again so that both ends of the hollow fibers emerge from the same end of the shell.

Still another design for fluid separation devices is described by McCormack in U.S. Pat. 3,246,764 wherein the hollow fibers are positioned longitudinally within the shell such that one end of each hollow fiber emerges from one end of the shell, while the other end of each fiber is sealed off at a point within the shell to prevent communication between the interiors of the hollow fibers and the interior of the shell outside the hollow fibers, i.e., between the capillary side and the shell side.

In the prior art devices for effecting separation of fluids by permeation of hollow fiber or capillary membranes and as illustrated in the aforementioned structural designs, a structural consideration of paramount importance from the standpoint of satisfactory operation relates to the wall members or capillary sheets employed therein. Generally, these structural elements are formed about the ends of the hollow fibers or capillaries by the application of a suitable cement in an initially fluid state which is thereafter permitted or caused to harden. The hardened cement comprises a header plate or capillary sheet which separates the region on the one side of the capillary sheet communicating with the outer areas of the fibers, i.e., shell side, from the region on the opposite side of the capillary sheet which is in communicating relationship with the hollow interiors of the fibers, i.e., capillary side. The techniques and compositions employed in forming the capillary sheets are well known in the art and are many and varied, including those described by Mahon, infra. While many factors dictate the choice of a cement composition, the controlling factors are inertness to chemical or solvent action by any of the components of the fluids with which it is to be used as well as ability to provide a fluid-proof seal at the particular pressures and temperatures to which the permeation device is to be subjected. Suitable cements employed in the prior art include phenolaldehydes, thermosetting artificial rubbers, acrylic resins and other liquid, settable organic cements, a generally preferred cement comprising epoxy resins.

While the aforementioned fluid separation or permeation devices have found application in a wide range of separating procedures, ever-increasing demands for the economical production of potable or agriculturally suitable water from saline and brackish water have placed particular emphasis upon the reverse osmosis or ultrafiltration procedure. The potentially low energy requirements of this procedure coupled with the large transfer areas afforded by the hollow fiber devices would appear to present a unique combination of factors capable of providing the desired economical solution to the problem of increased water production.

The attractiveness of the combination, however, has been considerably diminished by developments recently come to light. These developments relate to the problems of creep and plastic deformation occasioned by the capillary sheets as a direct result of the relatively high pressures, e.g., 400 to 1600 p.s.i., employed in reverse osmosis procedures. Attendant problems consequentially resulting therefrom relate to the attenuation and ultimate rupture of the hollow fiber membranes in double-ended devices and the constriction and ultimate plugging of the hollow fiber ends in single-ended devices and to leakage because of cracks in the capillary sheets.

McLain shows, in U.S. Pat. 3,442,008, one approach to resolving these problems. In a permeation separation device in which hollow fiber capillaries are spirally wound around a core and cast resin capillary sheet wall members are provided at one or both ends of the spirally wound fibers, a perforated metal plate is provided adjacent to the low-pressure face of the capillary sheet. This metal plate is said to make practical a greater efficiency and economy at lower cost (or requirement) of resin in the capillary sheet and to promote better utilization of the capillary membranes since the cast capillary sheet can be significantly thinner than it would be without mechanical support by the perforated metal plate.

The proposed solution creates other problems, however. Such perforated metal plate support members are themselves inefficient in that they reduce the efficiency of the separation device by blocking significant numbers of the capillary tubes. It is impractical to form them with enough perforations sufficiently close together to avoid such blockage of the capillary tubes. As shown in the patent, the metal plates also require additional gaskets for sealing the separation device, since the metal plates are gasketed between the shell of the device and the outer closure at the end of the shell.

SUMMARY OF THE INVENTION

The invention is directed to an improvement in a permeation separation apparatus comprising a shell, at least one end closure for said shell, at least one polymeric cast wall member forming a first region with said shell and a second region with said end closure, and a plurality of capillaries of selectively permeable material within said first region extending through said wall member and having open ends terminating at the face of said wall member adjacent said second region, said open ends permitting communication between the hollow interiors of said capillaries and said second region, the improvement serving to restrict plastic deformation and maintain the relative position of said wall member within said apparatus when a pressure differential is applied to said wall member and comprising an inert porous, non-compressible material adjacent to the lower pressure face of said wall member and adapted to transmit to said apparatus a force corresponding to said pressure differential.

The invention stems in part from a recognition of the problems that attend subjection of polymeric cast wall members, generally employed in permeation separation apparatus incorporating selectively permeable membranes of hollow fiber or capillary configuration, to a pressure differential for extended periods of time, as occurs during reverse osmosis or ultrafiltration operation. These problems relate essentially to the dimensional and relative positional changes as are involved in creep and cold flow or plastic deformation and as are occasioned by the polymeric cast wall members and to such consequential problems as attenuation and rupture of the capillaries or to development of cracks in the wall members unless they are supported at closely spaced points.

The invention is based on the concept that the foregoing problems may be solved by the inclusion of an inert, porous, non-compressible material adjacent to the lower pressure face of the polymeric cast wall member in a manner to transmit to the apparatus, i.e., the rigid portions thereof such as the end closure and shell, the pressure differential applied to said wall member during operation of the apparatus. The inventive construction permits the use of a broadened range of potting compounds for casting the wall members or capillary sheets since the support provided the latter by such construction eliminates creep, cold flow, bending and shear properties as factors for consideration in selecting a potting compound. The invention also makes possible significant economies in the size of the wall members and, consequently, in the permeation separation apparatus, since a reduction in the required wall member thickness for withstanding the relatively high operating pressures is made feasible. Economical benefits of the invention are not limited thereto but extend to economies of operation since a reduction in the size of the wall member is reflected in a reduction in the pressure drop in the capillary tubes. The invention construction also makes practical simplified apparatus constructions in which the support material is in turn supported on its surface opposite to the surface adjacent to the cast capillary sheet wall member. As a result, the support member can be of a relatively flexible material and construction.

DETAILED DESCRIPTION OF THE INVENTION

Support material for capillary sheets

In accordance with the present invention, the support material employed to restrict cold flow and plastic deformation of cast capillary sheets in permeation separation apparatus used in high pressure separator procedures, such as reverse osmosis, necessarily is porous and non-compressible in nature. In addition, such material is essentially inert or non-reactive with respect to fluids with which contact is made during the course of the separatory operation.

The support material of this invention contains surface segments which are completely flat or, at most, slightly rounded, and are of a sufficient size and small separation to provide small-scale support for the face of the cast polymeric resin capillary sheet wall member containing the ends of polymeric hollow fiber membranes. Such a surface is uniplanar to a degree sufficient to prevent small-scale cold flow, creep, and plastic deformation of the cast polymeric wall member and of the hollow fibers contained therein without significantly restricting flow from the open ends of the hollow fibers.

The required degree of flatness, number, size, and distance of separation of the surface segments in the support member surface depends on the unit compressive and shear strengths of the cast polymeric material comprising the capillary sheet wall member, the thickness of the wall member, and the applied differential pressure during use of the apparatus for permeation separations. Less perfectly flat, smaller, and more widely separated surface segments are useful when the cast resin material is hard and resistant to creep, cold flow, and plastic deformation, with thicker wall members, and in apparatus operated at lower applied differential pressures.

The factors determining the required flatness of the support surface are interrelated. The support segments can be less flat and more rounded or pointed when the surface contains larger numbers of smaller segments closer together. The support segments are preferably less perfectly flat when larger in area and closer together to avoid blocking flow from the ends of hollow fibers opening at the surface of the wall member. The number of segments is less critical when the segments are more flat, larger, and closer together. The segments can be farther apart when they are larger and more perfectly flat.

The flatness of the surface segments determines the effective width of the segments, the smallest width which is in contact with the cast wall member while the wall member is supported by the support member. For example, the surface segments of the support member should in general be both so large in area and so flat that the segments have a smallest effective width no more than a multiple of 30 to 50 times the average inside diameter of the hollow fiber or capillary membranes in order to avoid excessive pluggage of the open ends of the fibers in a typical capillary sheet wall member. With hollow fiber membranes having average inside diameters of 75 microns, a multiple of 30 gives support segments with an effective flat surface width of 2250 microns or slightly less than one-tenth inch. Smaller surface segments with effective widths no larger than two or ten times the average inside diameter of the hollow fibers are also useful. Surface segments 10 to 30 times the average inside diameters are preferred. With hollow fibers of 25 microns inside diameter, the surface segments are preferable about 250 to 750 microns or 0.01 to 0.03 inch in effective width.

Likewise, the surface segments of the capillary sheet wall member support structure should be close enough together to restrict or prevent creep, cold flow, and other such plastic deformation of the cast resin capillary sheet wall member. The average effective closest distance between the surface segments can be conveniently described by specifying the fraction of the total support member surface represented by the total support segment area and the average effective diameters of the support segments as defined above. Support segment area fractions between about 30% and 70% of the total support member area are effective. Preferably, the fraction is between about 35% and about 60%. For example, support segments 0.02 inch in diameter and in square array at a distance of closest approach of 0.01 inch occupy about 35% of the total support member area. With many practical support member materials the surface segments will be larger in one dimension than in others and therefore will not be near circular in shape; such support members can represent a larger fraction of the total support surface area.

By a porous material is meant a material containing many small open pores or passageways of substantially uniform cross-sectional dimensions of the spacings between the surface segments as described above so that flow of fluid from the open ends of the hollow fibers or capillaries in the capillary sheets is not impeded.

The porosity of the support material is ideally such that no impediment to free flow of permeate is offered. From a practical standpoint, the invention contemplates porous support materials wherein the pores are sufficiently large to permit substantially free flow of permeate, yet sufficiently small to provide an adequate bearing area contiguous the low pressure face of a cast capillary sheet. When the low pressure face of a cast capillary sheet is adjacent the capillary side chamber of a permeation separation device, the support material preferably comprises a substantial proportion of pores having an average diameter at least as large as and no larger than a small multiple, e.g., 2 or 3 times, of the average inner diameter of the capillaries. This latter limitation is desirable for the purpose of minimizing pressure drop in the apparatus and effecting economy of operation. In some effective materials, the pores are smaller in those portions of the support material which are close to the face supporting the cast resin capillary sheet wall member and larger in those portions which are away from the supporting face. That is, the material may have a graduated porosity. The pores may be substantially uniform in shape and also straight in path, but in most useful support materials they are irregular in shape and tortuous in path. The pores are preferably substantially uniform in size and shape at the support material surface adjacent the cast wall member, but can have a range in diameters up to about 4-fold without significantly affecting utility. Materials with a small fraction of larger pores at the support member surface can also be useful with particularly creep-resistant wall members or in apparatus operated at low applied differential pressure. The fraction of the total volume of the support material represented by pores can be between about 25% and 75% and is preferably between about 35% and 65% of the total bulk volume.

The support material of this invention while porous may also be said to have interconnected porosity. By a material with interconnected porosity is meant a material in which pores are connected by openings so that a fluid can flow through the material in all directions. Preferably the connecting openings in any portion of the material are of substantially the same cross-sectional area as the pores in that portion so that a fluid can flow through the material with substantially the same resistance to flow in all directions. Of course, the resistance to flow decreases in a material of graduated porosity as fluid passes from a portion containing smaller pores to a portion containing larger pores but preferably the resistance to fluid flow is uniform in all directions at right angles to the direction of porosity gradation.

It is most important that the support material be essentially non-compressible under the conditions of the separatory operation since the desired results of avoidance of dimensional and relative positional changes with regard to the cast capillary sheets will not otherwise be achieved. In general, the strength in compression of the support material should be such as to permit its desired functional role of transmitting to the rigid portions of the permeation separation apparatus the pressure differential applied to the capillary sheet. Under the preferred conditions of this invention, the lower pressure face of a cast capillary sheet is adjacent the capillary-side chamber and the support material occupies the latter and serves to transmit the pressure differential to the end closure.

Substantially any inert, non-compressible material which exhibits adequate porosity will suffice for purposes of the invention. The support member material of this invention includes sand, ceramic as herein defined, metals or powdered metals.

A preferred material from the standpoint of low cost and ready availability as well as the desired characteristics of inertness, non-compressibility and porosity is sand.

Sand, of course, is obtainable in a wide variety of granular sizes and therefore permits great flexibility in providing a support material exhibiting an optimum combination of bearing area and permeate flow characteristics. In addition, the granular nature of sand permits it to readily assume the shape of the chamber to which it is added as well as to provide a flush fit with the face of a cast capillary sheet or wall member no matter how irregular or lacking in smoothness. These factors are all important in the transmission to the apparatus frame of any pressure differential imposed on the cast capillary sheet without the incidence of cold flow or plastic deformation of the latter. While a granular support material, such as sand, may be employed in its free-flowing state, for convenience in the assembly and disassembly of the permeation separation apparatus and to avoid granules being carried out with the permeate, it is preferred that the granular support material be bonded. Suitable bonding media comprise cementitious or adhesive materials which are effective to provide strong bonds with the support material without significantly affecting the essential characteristics of inertness, porosity, and non-compressibility. Such media include phenolaldehyde resins, melaminealdehyde resins, thermosetting artificial rubbers, acrylic resins and other bonding materials which do not react with or otherwise adversely affect the permeate. Preferred bonding materials comprise the epoxy resins, which are particularly suitable because of their inertness to solvents, chemical corrosion resistance and setting characteristics. Suitable epoxy resins for the practice of the invention are those derived from the diglycidyl ether of bisphenol, diglycidyl ethers of resorcinol, dihydroxy diphenyl, hydroquinone, etc. These can be modified by the addition of modifying resins, preferably amine resins, and appropriate curing agents and solvents. Certain materials can be used to serve both as a solvent and also to participate in the curing reaction, such as liquid amines. While the composition of the resin is not critical, it is important that the resin have a low viscosity such that the sand or other support material can be uniformly wet thereby. Further, the resin must be capable of hardening to bond the support material without defeating the desired porous structure. Accordingly, epoxy resin bonded sand is illustrative of a bonded support material suitable for the practice of the invention.

Another type of support material suitable for the practice of this invention is a ceramic which may be a uniformly porous unglazed ceramic bonded by firing until it is non-compressible or alumina bonded with fused silica. Such materials are made in a range of uniform porosities and degrees of surface smoothness by appropriate choice of grain size and bonding system. They are typically used as filter media, gas diffusion devices, diaphragms, and grinding stones. Representative forms contain about 83% aluminum oxide (alumina) and about 13% silicon dioxide (silica) as a bonding agent with minor amounts of other materials. The bonding materials described above may also be used in bonding what is considered as ceramic herein. They can have pores of about 0.1 to 0.3 millimeter in average diameter which represent about 35% of the bulk volume. A preferred silica bonded particulate alumina material for use in practicing this invention contains pores about 0.2 millimeter in average diameter.

Another type of construction and material which is particularly preferred for use as a support member as taught herein is a woven wire screen. A screen of typical construction is non-compressible under the pressures involved in permeation separation processes and has a substantially planar surface and interconnected uniform porosity as defined herein. If made of a suitable metal like iron, copper and the corrosion resistant alloys, it is inert to permeate fluids.

For example, a United States Sieve Series 10-mesh screen contains openings nominally 0.066 inch square between wires 0.032 inch in diameter, with an open area of 44% of the gross area. Particularly if pressed or coined to increase the area of the surface segments, such a screen has surface segments about 0.01 to 0.03 inch in effective width at an effective closest distance of somewhat less than 0.1 inch. These surface segments occupy about 25% of the gross area. Screens of more fine wires and smaller mesh have surface segments with smaller effective closest distances which occupy larger fractions of the gross surface area. Screens of different weaves can have rectangular instead of square openings and therefore larger surface segments with smaller effective closest distances.

Permeation separation apparatus

The inventive feature relating to improvements with respect to supported cast capillary sheets is generally applicable to permeation separation apparatus incorporating hollow fibers or capillaries which are held in place or positioned by cast wall members or capillary sheets and which are intended for use in separatory processes wherein a pressure differential is applied to such wall members or capillary sheets, e.g., reverse osmosis or ultrafiltration processes.

The various inert, porous, non-compressible materials described above are used as mechanical support members as taught herein in permeation separation apparatus comprising a shell, an end closure for the shell, a polymeric cast wall member forming a first region with the end closure, a plurality of capillaries of selectively permeable material within the first region, extending through the wall member, and having open ends terminating at the face of the wall member adjacent to the second region.

In such a permeation separation apparatus, the support member is adjacent to and in uniform contact with the face of the wall member at which the capillary membranes terminate. The support member is also within the second region bounded by the wall member and the end closure. It supports the wall member, transmitting to other parts of the apparatus the pressure differential applied to the wall member when the apparatus is used for permeation separation processes and restricting plastic deformation of the wall member because of the applied pressure differential.

FIGS. 1, 2, 3 and 4 are cross sectional views of permeation separation apparatuses.

A more complete understanding of the manner in which the inventive feature may be applied to permeation separation apparatus is afforded by reference to the drawings.

Referring first to FIG. 1, there is shown a sectional view in elevation of a horizontally disposed permeation separation apparatus of the double-ended type. The permeation apparatus or cell 10 comprises a casing or shell 11 containing a plurality of hollow fibers or capillaries 14 which are potted in header plates or capillary sheets 12 and 13. The capillaries 14 are open at their ends which are flush with the outer faces of capillary sheets 12 and 13, respectively, to permit communication between the hollow interiors of capillaries 14 and capillary-side chambers 15 and 17. Support members 16 and 18 completely fill chambers 15 and 17, respectively, and provide a bearing surface flush with the outer faces of cast capillary sheets 12 and 13, respectively. Fluid at high pressure is fed into cell 10 through feed inlet 19 near one end of shell 11, permeates through the walls of capillaries 14, passes through the hollow interiors thereof into capillary-side chambers 15 and 17 for collection where it percolates through the interstices or pores of epoxy resin bonded sand 16 and 18, respectively, and is withdrawn through outlets 21 and 22, respectively. Fluid not permeated is withdrawn through outlet 20 of shell 11.

The invention is depicted in FIGS. 2 and 3 in combination with a permeation separation apparatus of a single-ended type. FIG. 2 is illustrative of such a type wherein the hollow fibers or capillaries are looped or doubled back within the shell with both ends of each capillary being encapsulated within a single capillary sheet 54a. FIG. 3 is illustrative of a single-ended construction wherein but one end of each capilliary is encapsulated in a single capillary sheet 54b while the other end is sealed or closed at a point within the shell-side chamber. Operation of the devices shown in FIGS. 2 and 3 with respect to a reverse osmosis separation procedure is essentially the same, and accordingly a single description is applicable to either device. Fluid at high pressure is introduced to cell 50 via feed inlet 51 of shell 53, permeates the wall of looped capillaries 55a in FIG. 2 or the walls of sealed end capillaries 55b in FIG. 3, passes through the hollow interiors of the respective capillaries into capillary-side chamber 56 for collection while percolating through the pores of support member 57, and is withdrawn through outlet 58. The portion of the feed fluid which does not permeate through the capillary walls exits shell 53 via outlet 52. Head 59 which contains support member 57, e.g., epoxy resin bonded sand, is joined to shell 53 by bolts 60.

The invention is depicted in FIG. 4 in combination with a permeation separation apparatus of a different single-ended type. Fluid at high pressure is introduced into cell 150 by way of feed inlet 151 of shell 153 and portions of the fluid permeate the walls of capillaries 155, pass through the hollow interiors of the capillaries through capillary sheet 154, percolate through the pores of support member 157 located in capillary-side chamber 156 and are withdrawn through outlet 158. The portion of the feed fluid which does not permeate through the capillary walls exits shell 153 by way of outlet 152. End closure 159 which supports porous material 157 is retained inside shell 153 by retaining ring 160 fitting into groove 161 in shell 153. Gaskets 162 and 163 seal capillary 154 and end closure 159 to shell 153.

It should be noted that satisfactory support structure of the type shown in FIGS. 1, 2, 3 and 4 can be formed by packing a mixture of a particulate matter and bonding agent into the head space of an assembled permeation separation apparatus. Alternately, such a mixture can be packed into an apparatus head and cured before assembling the apparatus. Machining procedures like those described in U.S. Pat. 3,503,288 (Swartling) can be used to provide the capillary sheet with a smooth surface for contact with the support member. Alternatively, a flat plate of bonded particulate matter can be preformed with a smooth surface for contacting the capillary sheet and installed in a head designed to provide support through a shoulder, lugs, or other equivalent structures. Such a technique requires a more complex head shape but may require a smaller volume of support material and permits independent production of the head of the permeation separation apparatus. In such cases, the support member will not completely fill the head space of the apparatus. Also alternately, a screen wire support member can be placed between a wall member and supporting end closure. This screen support member can comprise two or more separate screens and the screen adjacent to the wall member may be made of finer wires in a more fine mesh than a screen farther away from the wall member.

Similarly, two shells and capillary sheets of the construction of any of the figures can be assembled in such a way that two capillary sheets are supported by a single support member so that fluid permeating through the capillary membranes percolates through the support member and is withdrawn through a single outlet in a suitable sealing, supporting, and spacing element.

The foregoing detailed description has been given for clarity of understanding only and no unnecessary limitation are to be understood therefrom. The invention is not limited to exact details shown and described for obvious modifications will occur to one skilled in the art.

What is claimed is:
1. In a permeation separation apparatus comprising a shell,
at least one end closure for said shell,
at least one polymeric cast wall member forming a first region with said shell and a second region with said end closure, and
a plurality of capillaries of selectively permeable material within said first region extending through said wall member and having open ends terminating at the face of said wall member adjacent said second region,
said open ends permitting communication between the hollow interiors of said capillaries and said second region,
the improvement for restricting plastic deformation of said wall member and maintaining the relative position thereof within said apparatus when a pressure differential is applied to said wall member comprising
an inert, porous, non-compressible material adjacent the lower pressure face of said wall member and adapted to transmit to said apparatus a force corresponding to said pressure differential, said material having surface segments which are from 10 to 30 times as wide as the average inside diameter of the capillaries, the total area of said surface segments making up from about 30 to about 70% of the total surface area of said material, the balance of said surface area consisting essentially of pores having an average inner diameter of from at least 1 to about 3 times the average inside diameter of the capillaries.

2. An apparatus according to claim 1 wherein said inert, porous, non-compressible material comprises a substantial proportion of pores which are interconnected by openings having substantially the same cross-sectional area as the pores.

3. An apparatus according to claim 2 wherein said lower pressure face of said wall member is adjacent said second region.

4. In a permeation separation apparatus comprising a shell having two ends,
a pair of end closures affixed respectively to said shell ends,
a pair of spaced-apart, substantially parallel, polymeric cast wall members forming a middle chamber with said shell and a pair of end chambers respectively with said pair of end closures, and
a plurality of capillaries of selectively permeable material within said middle chamber extending through said pair of wall members and having open ends terminating at the faces of said wall members adjacent said end chambers,
said open ends permitting communication between the hollow interiors of said capillaries and said end chambers,
the improvement for restricting plastic deformation of said wall members and maintaining the relative positions thereof within said apparatus when a pressure differential is applied to said wall members comprising
an inert, porous, non-compressible material adjacent the lower pressure faces of said wall members and adapted to transmit to said apparatus a force corresponding to said pressure differential, said material having surface segments which are from 10 to 30 times as wide as the average inside diameter of the capillaries, the total area of said surface segments making up from about 30 to about 70% of the total surface area of said material, the balance of said surface area consisting essentially of pores having an average inner diameter of from at least 1 to about 3 times the average inside diameter of the capillaries.

5. An apparatus accordinng to claim 4 wherein the lower pressure face of each wall member is adjacent one of said end chambers, the pores in the porous material are interconnected and the surface segments are about 250 to 750 microns in effective width.

6. An apparatus according to claim 5 wherein the inert, porous, non-compressible material comprises sand, ceramic, metal or powdered metal.

7. An apparatus according to claim 6 wherein the inert, porous, non-compressible material is a bonded sand, ceramic, or powdered metal.

8. An apparatus according to claim 5 wherein the inert, porous, non-compressible material is a metallic screen.

9. In a permeation separation appaartus comprising
a shell having an open end and a closed end,
an end closure affixed to the open end of said shell,
a polymeric cast wall member forming a first chamber with said shell and a second chamber with said end closure, and
a plurality of capillaries of selectively permeable material within said first chamber extending through said wall member and having open ends terminating at the face of said wall member adjacent said second chamber,
said open ends permitting communication between the hollow interiors of said capillaries and said second chamber,
the improvement for restricting plastic deformation of said wall wember and maintaining the relative position thereof within said apparatus when a pressure differential is applied to said wall member comprising an inert, porous, non-compressible material adjacent the lower pressure face of said wall member and adapted to transmit to said apparatus a force corresponding to said pressure differential, said material having surface segments which are from 10 to 30 time as wide as the average inside diameter of the capillaries, the total area of said surface segments making up from about 30 to about 70% of the total surface area of said material, the balance of said surface area consisting essentially of pores having an average inner diameter of from at least 1 to about 3 times the average inside diameter of the capillaries.

10. An apparatus according to claim 9 wherein the middle portion of each of said capillaries forms a loop within said first chamber proximate said closed end of said shell, the two end portions of said loop extending the length of said first chamber through said wall member and terminating in open ends in the face of said wall member adjacent said second chamber, the pores in the porous material are interconnected and the surface segments are about 250 to 750 microns in effective width.

11. An apparatus according to claim 10 wherein the lower pressure face of said wall member is adjacent said second chamber.

12. An apparatus according to claim 11 wherein the inert, porous, non-compressible material comprises sand, ceramic, metal or powdered metal.

13. An apparatus according to claim 11 wherein the inert, porous non-compressible material is a bonded sand, ceramic, or powdered metal.

14. An apparatus according to claim 11 wherein the inert, porous, non-compressible material is a metallic screen.

15. An apparatus according to claim 9 wherein each of said capillaries has an open end in the face of said wall member adjacent said second chamber and extends therefrom through said wall member substantially the length of said first chamber to its closed end proximate said closed end of said shell, the pores in the porous material are interconnected and the surface segments are about 250 to 750 microns in effective width.

16. An apparatus according to claim 15 wherein the lower pressure face of said wall member is adjacent said second chamber.

17. An apparatus according to claim 16 wherein the inert, porous, non-compressible material comprises sand, ceramic, metal or powdered metal.

18. An apparatus according to claim 16 wherein the inert, porous, non-compressible material is a bonded sand, ceramic, or powdered metal.

19. An apparatus according to claim 16 wherein the inert, porous, non-compressible material is a metallic screen.

References Cited

UNITED STATES PATENTS

| | | | |
|---|---|---|---|
| 3,422,008 | 1/1969 | McLain | 210—22 |
| 3,252,272 | 5/1966 | Hazen et al. | 55—158 |
| 3,303,933 | 2/1967 | Huff | 210—441 |
| 3,504,801 | 4/1970 | Alexander | 210—321 |
| 3,133,132 | 5/1964 | Loeb et al. | 264—49 |
| 3,228,876 | 1/1966 | Mahon | 210—22 |
| 2,042,564 | 6/1936 | Sweetland | 210—314 X |
| 3,526,001 | 8/1970 | Smith | 210—321 X |

FRANK A. SPEAR, JR., Primary Examiner